(12) United States Patent
Bradbury et al.

(10) Patent No.: US 6,671,121 B1
(45) Date of Patent: Dec. 30, 2003

(54) MINIMIZING MILLI-ACTUATOR REACTIVE IMPULSE AND EXCESSIVE POWER CURRENT

(75) Inventors: Robert T. Bradbury, Oklahoma City, OK (US); Travis E. Ell, Austin, TX (US)

(73) Assignee: Seagate Technology LLC, Scotts Valley, CA (US)

( * ) Notice: Subject to any disclaimer, the term of this patent is extended or adjusted under 35 U.S.C. 154(b) by 309 days.

(21) Appl. No.: 09/644,410

(22) Filed: Aug. 23, 2000

Related U.S. Application Data
(60) Provisional application No. 60/150,717, filed on Aug. 25, 1999.

(51) Int. Cl.$^7$ .............................................. G11B 5/596
(52) U.S. Cl. .................................................. 360/78.06
(58) Field of Search ........................ 360/78.04, 78.05, 360/78.06, 78.08, 78.12, 5, 75

(56) References Cited

U.S. PATENT DOCUMENTS

| | | | |
|---|---|---|---|
| 5,081,552 A | | 1/1992 | Glaser et al. ............ 360/98.01 |
| 5,920,441 A | * | 7/1999 | Cunningham et al. ... 360/78.05 |
| 6,101,058 A | * | 8/2000 | Morris .......................... 360/69 |
| 6,292,320 B1 | * | 9/2001 | Mason et al. .................. 360/63 |

* cited by examiner

Primary Examiner—David Hudspeth
Assistant Examiner—Mitchell Slavitt
(74) Attorney, Agent, or Firm—David K. Lucente; Derek J. Berger

(57) ABSTRACT

An information handling system, such as a disc drive, includes a base, a disc stack rotatably attached to the base, and an actuator assembly movably attached to the base, with multiple movable mill-actuator arms mounted on one portion of the actuator assembly. Attached to an end of the actuator is a voice coil which forms a portion of a voice coil motor. Magnets attached to the base form the other portion of the voice coil motor. A current driver for the voice coil delivers an amount of current to the voice coil to move the actuator assembly. Attached to another end of the actuator assembly is one or more transducers. In order to minimize the disturbance of a seeking milli-actuator, the operation to be executed is to cause the first milli-actuator to return slowly to its rest or zero position. A rate of return control circuit is implemented to drive a milli-actuator such that a milli-actuator at a non-zero or non-rest position will be returned to a rest position at a rate slower than a seeking milli-actuator.

14 Claims, 6 Drawing Sheets

MINIMIZING MILLI-ACTUATOR REACTIVE IMPULSE AND EXCESSIVE POWER CURRENT

RELATED APPLICATION

Present application claims the benefit of U.S. Provisional Application Ser. No. 60/150,717, filed Aug. 25, 1999 under 35 U.S.C. 119(e).

FIELD OF THE INVENTION

The present invention relates to the field of mass storage devices. More particularly, this invention relates to an actuator assembly in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

The read and write functionality of some disk drives is sometimes implemented using multiple movable milli-actuator arms mounted on one E-Block actuator arm. While other implementations of the read and write capability include a single moveable milli-actuator arm attached on the E-Block actuator arm. However, there can be undesirable performance problems when using the multiple movable milli-actuator design. When using multiple milli-actuator arms, one might expect to observe some manifestation of an interactive reaction of one milli-actuator on the other during seek operations. The problem confronting the industry is that this interaction can be detrimental to the operation of the disk drive, particularly when one milli-actuator is returning back to its zero position while the other milli-actuator is commanded to seek to a position. This degradation in operation can manifest itself as actuators experiencing seek errors or disturbances while on data tracks, and if the power supply capability is limited then drive operation can be impaired by the dual current draw demand.

What is needed is a disk drive configuration that not only minimizes milli-actuator reactive impulse but also provides a solution to excessive power current demands in disc drives using multiple moveable milli-actuator arms.

SUMMARY OF THE INVENTION

A method for minimizing the reactive impulse on a milli-actuator arm and relaxing the current demand on a power supply is disclosed. The method includes mounting several milli-actuator arms on a single E-Block actuator arm or a single actuator assembly. The method also includes causing a first movable milli-actuator arm to seek to a predetermined track position. Then a second movable milli-actuator arm is commanded to seek to a predetermined track position. The method further includes commanding a first movable milli-actuator arm to a rest position. The first movable actuator arm is commanded to return at a speed less than the speed of the second milli-actuator arm, when that second movable milli-actuator arm is seeking.

An information handling system is also disclosed. The information handling system includes a base, a disc rotatably attached to the base, and an actuator assembly movably attached to the base. The actuator assembly includes a voice coil attached to the actuator assembly. The information handling system further includes at least one magnet attached to the base and positioned near the voice coil to form a voice coil motor. The information handling system includes a system for commanding a first movable milli-actuator arm to return to a rest position at a reduced speed with respect to a second movable actuator arm when that second movable milli-actuator arm is commanded to seek. The information handling system also includes a processor for commanding the second movable milli-actuator arm to seek to a predetermined track position, wherein the second can be commanded to seek while the first movable milli-actuator arm is not at a rest position.

A disc drive is also disclosed. It includes a base, a disc rotatably attached to the base, an actuator attached to the base, one end of the actuator having a transducer and the other end of the actuator having a voice coil which forms a portion of a voice coil motor. The actuator includes a first rotatable portion, a second rotatable portion. The disc drive further includes a disc drive control circuit which includes a first rate of movement control circuit. The first rate of movement control circuit drives the first rotatable portion of the actuator at a different rate than the second rotatable portion. A second rate of movement control circuit drives the second rotatable portion of the actuator at a predetermined speed.

Advantageously, this invention has several features that can be useful in the application of mass storage device technologies. For example, by causing a first milli-actuator to return to a rest position at a reduced rate, with respect to the second seeking milli-actuator, improves the quality of operation by minimizing the reactive energy and thereby the disturbance to the seeking milli-actuator. Another advantage the present invention offers is an apparatus for simultaneously moving multiple milli-actuators and allowing them to be powered by a single, limited power supply. This reduces the degradation in the disc operation, which is often observed in such dual current draw scenarios. Furthermore, the present invention discloses circuitry that can drive the milli-actuators such that they travel in such a way as to exhibit the desirable characteristics discussed above. The circuitry according to the present invention also affords the circuit designer flexibility in their design.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
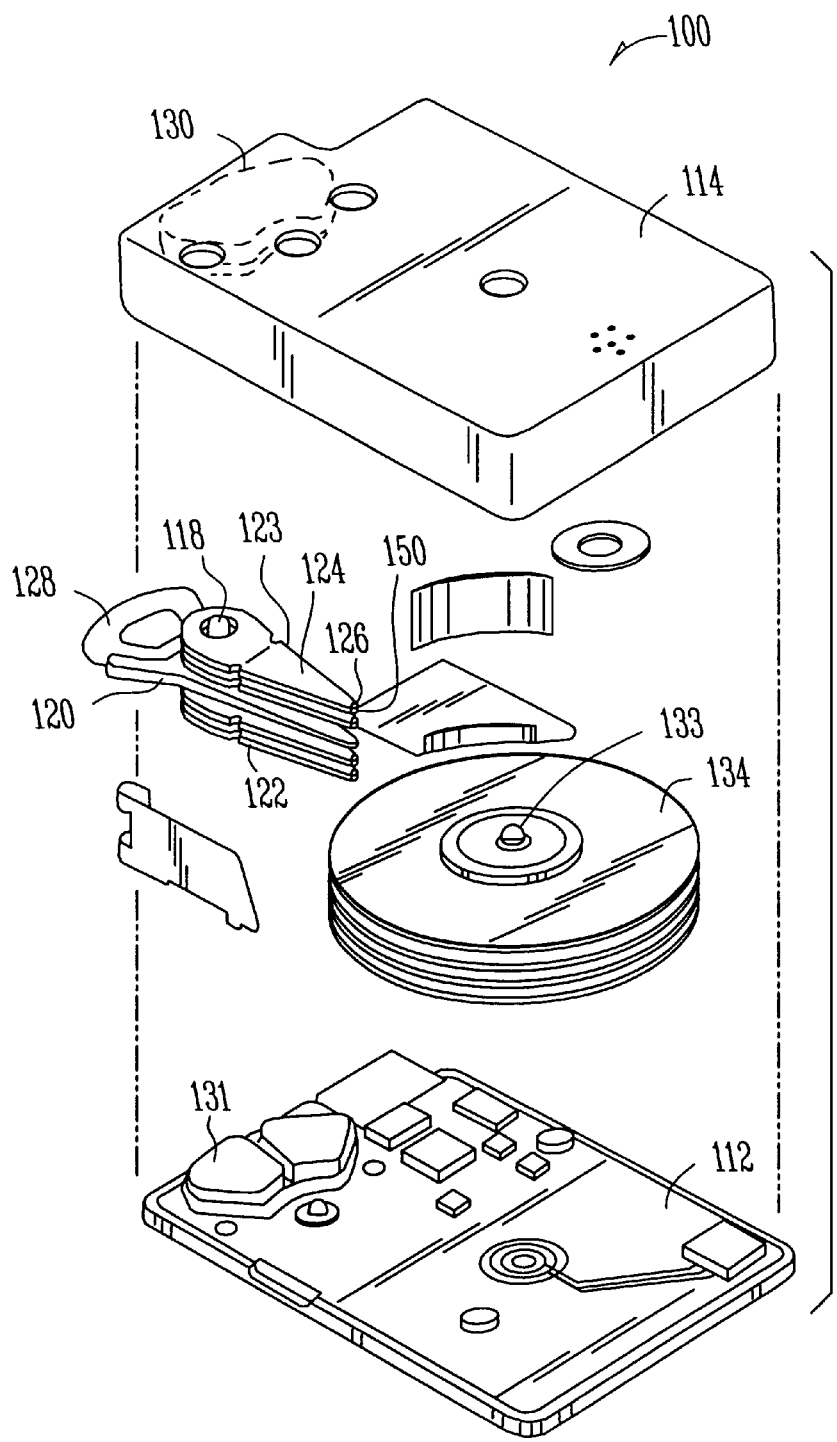
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes an E-block 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 130'. As shown in FIG. 1, the second magnet 130' is associated with the cover 114. The first and second magnets 130, 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
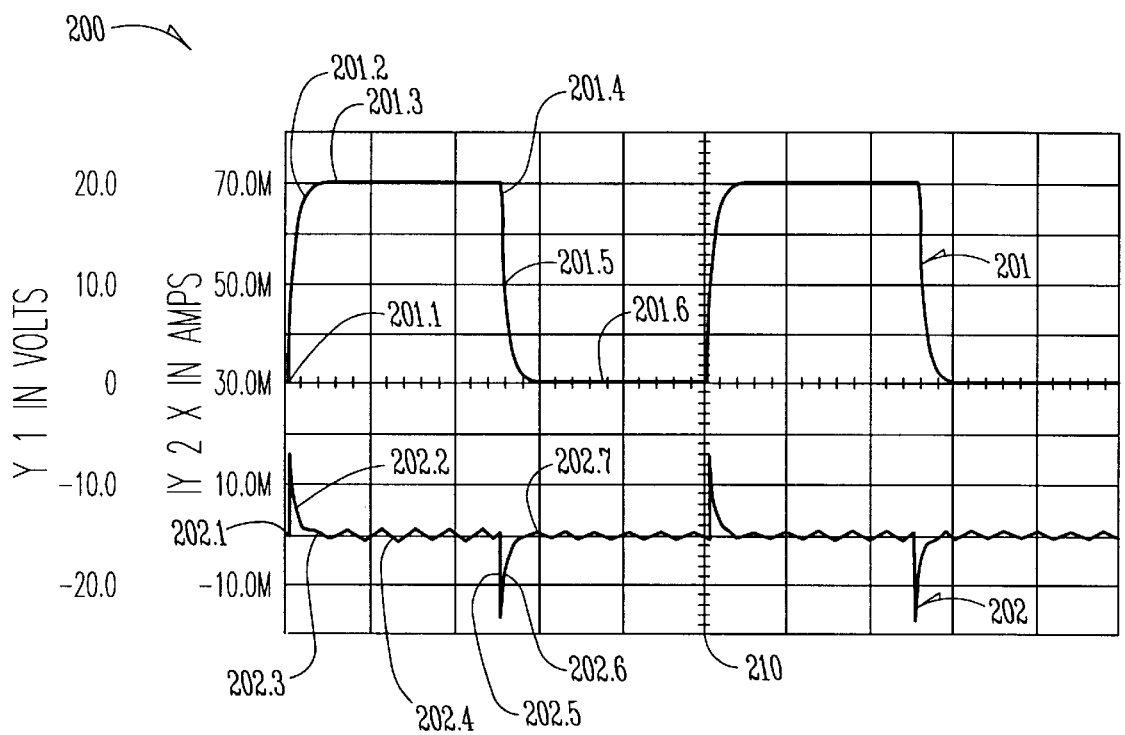
FIG. 2 is a milli-actuator driver voltage and current graph as the milli-actuator seeks from a rest, or zero position, to a data position and dwells at that position, then returns to rest again.

FIG. 2 is a top-plane view of a milli-actuator (600). FIG. 2 shows a milli-actuator driver voltage and current graph 200, according to the prior art. The graph illustrates both the waveform of the driver current 202 and the corresponding voltage waveform 201, as the milli-actuator is commanded to various track positions. More specifically, there is a sharp increase in the driver current 202.1 to cause the milli-actuator to begin seeking and the voltage begins to increase from a rest position voltage 201.1, which corresponds to the milli-actuator at its rest or zero position, to a first predetermined voltage level 201.3, that corresponds to the milli-actuator positioned at a desired data or track position. Notice the driver current's substantial decrease 202.2. The driver current is decreased so as to prevent the milli-actuator from overshooting the intended track position, thus the driver voltage is caused to increase more slowly 201.2, as it approaches the first predetermined voltage level 201.3. This change in voltage translates to the milli-actuator slowing down and approaching the desired data position. The driver current continues to decrease until it reaches a zero or equilibrium level 202.3, which approximately corresponds to the voltage waveform 201 reaching the first predetermined level 201.3 and the milli-actuator arriving at the desired data position. The driver current is incrementally increased and decreased from the zero or equilibrium level 201.3 over a dwell period 202.4 which results in maintaining the first predetermined voltage level 201.3 over the same period and correspondingly causes the milli-actuator to dwell at a desired track position.

At the end of the dwell period 202.4, the milli-actuator is driven with a sudden large negative driver current 202.5. When the large negative driver current 202.5 appears, the voltage waveform 201 decreases, the slope becomes negative 201.4, from the first predetermined level 201.3 and the milli-actuator begins to move towards it rest or zero position. Notice the driver current's substantial decrease 202.6. The driver current 202 is reduced so as to prevent the milli-actuator from overshooting the rest or zero position, thus the driver voltage 201 is caused to decrease more slowly 201.5 as it approaches the rest position voltage 201.6. This change in voltage translates to the milli-actuator slowing down and approaching its rest or zero position. The driver current 202 continues to decrease until it reaches a zero or equilibrium level 202.7, which approximately corresponds to the voltage waveform 201 reaching its rest position voltage 201.6 and the milli-actuator reaching its rest or zero position. The driver current 202 then oscillates approximately about the zero or equilibrium level 202.7, maintaining the driver voltage 201 at its rest or zero position 201.6 which corresponds to the milli-actuator remaining at its zero or rest position. Then at mid-scale 210 this operation is repeated.

The drive current 202 can also be thought of as an impulse of energy being delivered to the total mass of the actuator assembly. This impulse energy also has a reactive component which causes the E-Block assembly to move in a proportionally opposite direction carrying another milli-actuator with it. Now if another milli-actuator is commanded to seek during this impulse time, it can experience a seek error or as a disturbance while on a data track.

Figure 3:
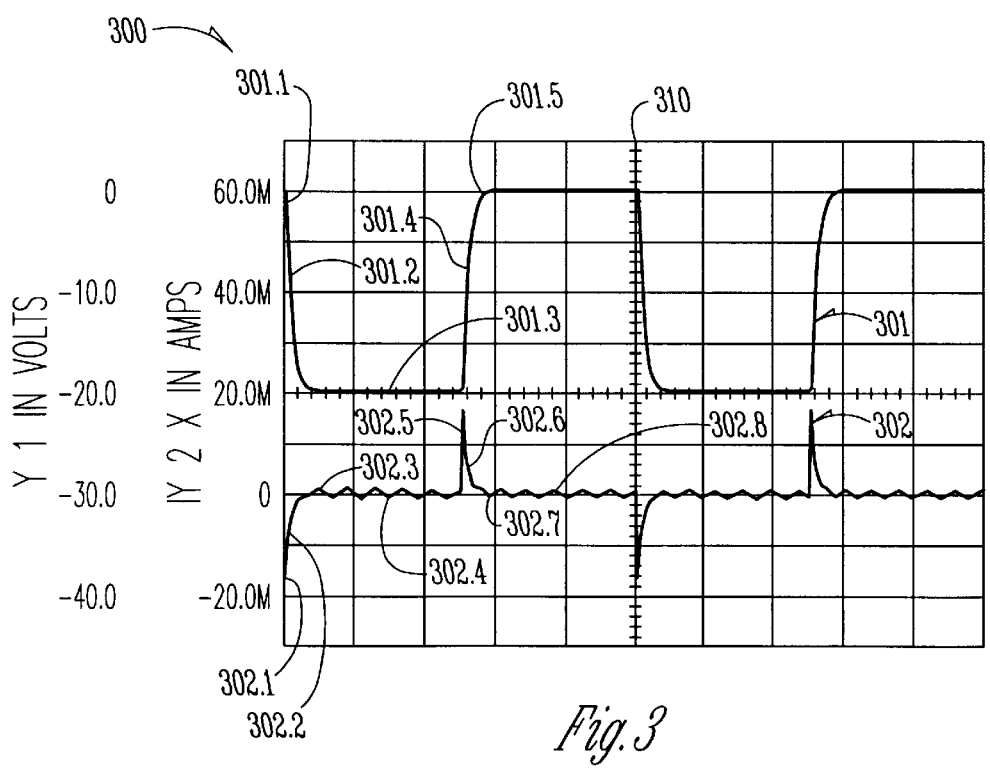
FIG. 3 is a milli-actuator driver voltage and current graph as the milli-actuator seeks, in the opposite direction, from a rest, or zero position, to some location and dwells then returns to rest again.

FIG. 3 is a milli-actuator driver voltage and current graph 300, according to the prior art. The graph 300 shows the actuator driver voltage waveform 301 and current waveform 302 that corresponds with a milli-actuator seeking in the opposite direction as that discussed regarding the graph shown in FIG. 2. There is a sharp increase in the negative driver current 302.1 to cause the milli-actuator to begin seeking to a different data position than that shown in FIG. 2. The voltage begins to decrease from a rest or zero position voltage 301.1, which corresponds to the milli-actuator at its rest or zero position, to a first predetermined voltage level 301.3 and this voltage level corresponds to the milli-actuator positioned at a desired data or track position. Prior to the driver voltage 301 reaching a first predetermined voltage level 301.3, the driver current 302 undergoes a substantial decrease in negative current as shown by the increasing driver current slope 302.2. The driver current 302 is decreased to prevent the milli-actuator from overshooting the data position it is intended to arrive at. This phenomenon is reflected by the driver voltage's decreasing slope 301.2, which corresponds to the milli-actuator slowing down as it approaches a desired data position. The driver current 302 continues to decrease until it reaches a zero or equilibrium level 302.3, which approximately corresponds to the driver voltage 301 reaching the first predetermined voltage level 301.3 and the milli-actuator arriving at the desired data position. The driver current 300 then oscillates approximately about its equilibrium position 302.3 over a dwell period 302.4. The driver current 302 behavior over the dwell period 302.4, results in the driver voltage 301 remaining at the first predetermined voltage level 301.3 and correspondingly causes the milli-actuator to dwell at the desired track position over the same dwell period 302.4.

At the end of the dwell period 302.4, the milli-actuator is caused to move towards its rest or zero position, as illustrated by the driver voltage 301 beginning to increase towards its zero position 301.1, because it is driven by a large positive driver current 302.5. When the large positive driver current 302.5 appears, the driver voltage 301 increases, the slope becomes positive 301.4, from the first predetermined voltage level 301.3 towards the zero position 301.1 again. Notice the driver current's 301 substantial decreased slope 302.6, the driver current 301 is reduced so as to prevent the milli-actuator from overshooting the rest or zero position and thus the driver voltage's 301 slope 301.4 is caused to increase more slowly as it approaches its rest position voltage 301.5. The driver current continues to decrease until it reaches a zero or equilibrium level 302.7, which approximately corresponds to the driver voltage 301 reaching the rest position voltage 301.5 and the milli-actuator returning to its rest or zero position. The driver current 302 then oscillates approximately about its equilibrium level 302.7 over a dwell period 302.8. The driver voltage 301 is maintained at its rest position 301.5 which corresponds to the milli-actuator remaining, or dwelling at, its zero or rest position. Then at mid-scale 310 this operation is repeated. The current wave can still be thought of as an impulse of energy delivered to the milli-actuator, as discussed with respect to FIG. 2 but just delivered in the opposite direction.

Figure 4:
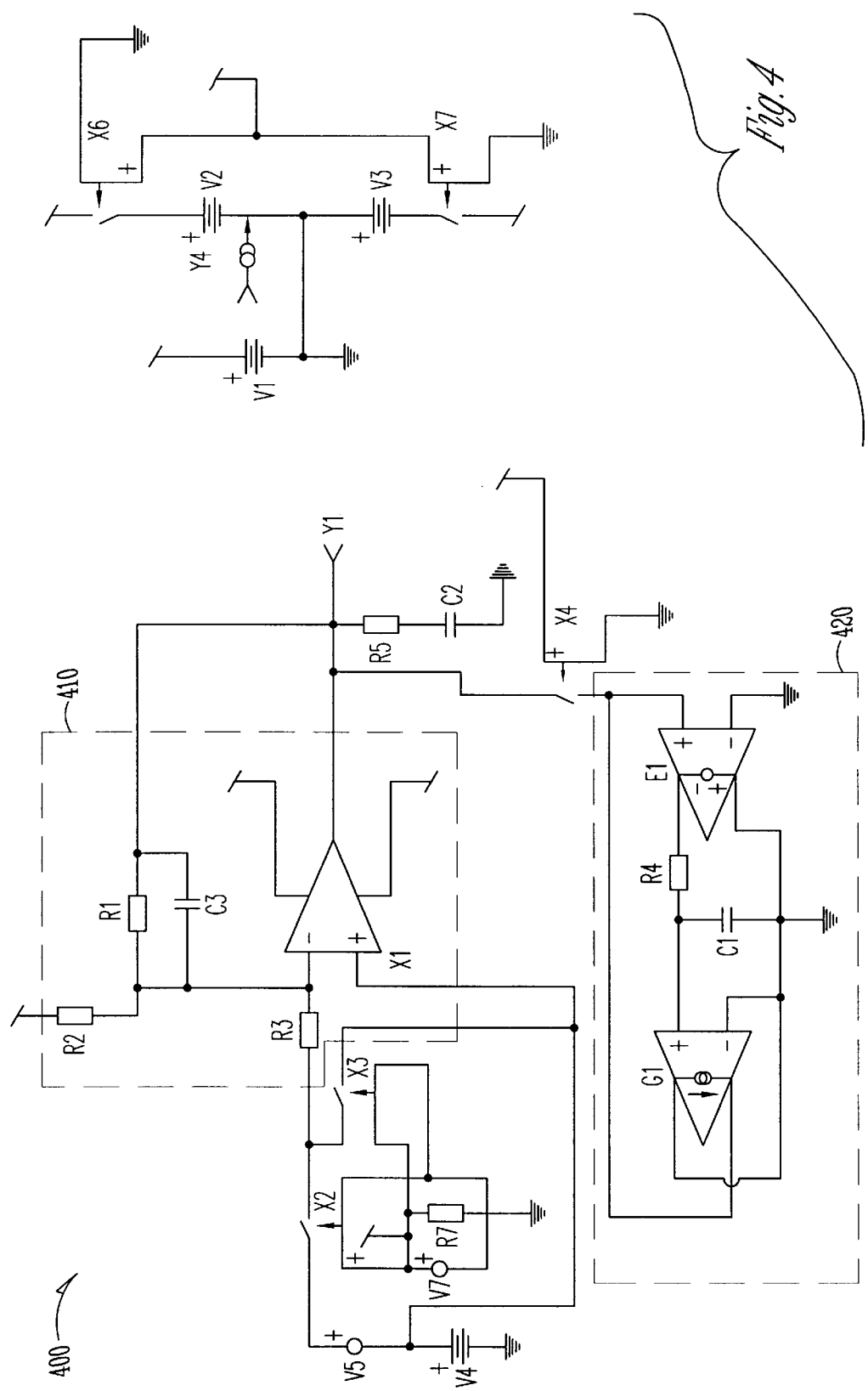
FIG. 4 is a rate of movement control circuit design according to the present invention.

FIG. 4 is a rate of movement control circuit 400 according to the present invention. The amplifier configuration 420 or operational amplifier, of FIG. 4 is one, which can generate a slow return to zero wave such as the one shown in signal 501 of FIG. 5. It should be noted that the amplifier configuration 420 illustrated is not the only configuration that will yield similar return to zero results, it is merely illustrative. An amplifier which is capable of having its slew rate controlled such that it is slow during the return back to zero time and normally fast during other times, as disclosed, will be usable in the present invention and thus can satisfy the low reactive impulse and power supply conserving requirement.

This circuit contains a operational amplifier 410 composed of X1, R1, R2, R3 and C3. Relays X6 and X7 are to disable the operational amplifier 410 in order that the transconductance amplifier 420 composed of E1 and G1 is able to charge the actuator back to zero. C2 and R5 simulate the milli-actuator. In the particular embodiment, the milli-actuator is a piezo device.

In this embodiment, the relays X2 and X3 serve to create an input rectangular wave much like that used in a disk drive to cause a seek to a track location. All relays are controlled by the pulse signal source V7 so that timing is preserved. Relay X4 disables the transconductance amplifier 420 during the seek to location time however. In another embodiment, relay X4 can be excluded from the circuit. The operational amplifier 410 can easily over power the transconductance amplifier 420 since it draws so very little current from the amplifer 410. Component parts C1 and R4 serve to provide a known frequency response limiting of the transconductance amplifier 420. The operation of this particular amplifier configuration 410 will be discussed in more detail below, along with an explanation of FIG. 5.

Figure 5:
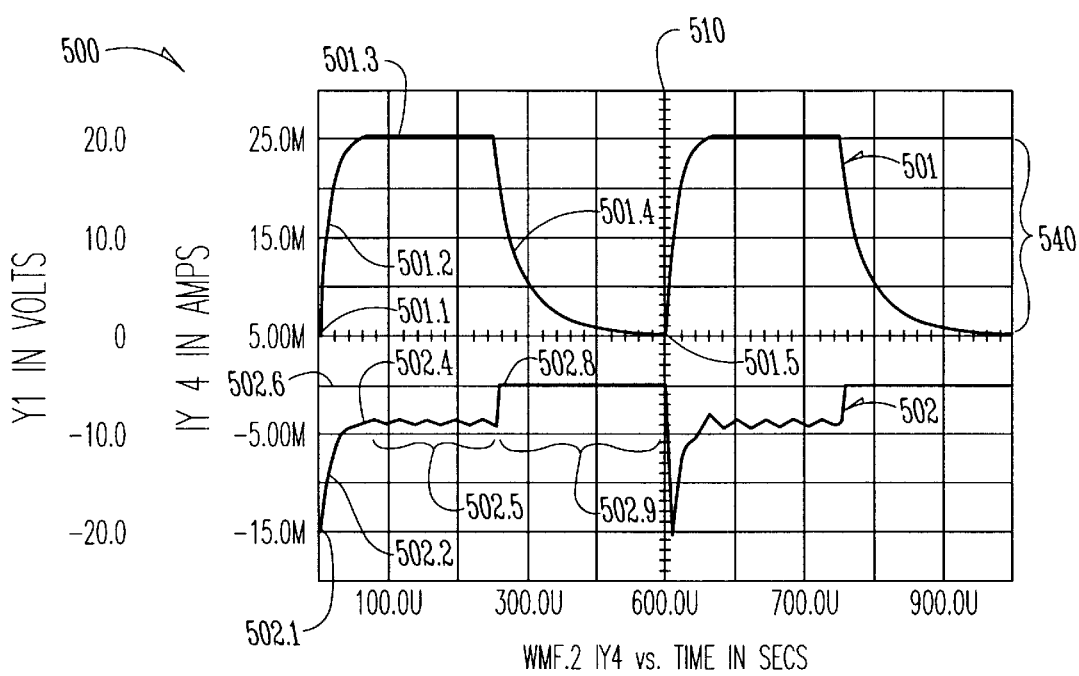
FIG. 5 is a milli-actuator driver voltage and current graph generated by a rate of movement control circuit according to the present invention as the milli-actuator seeks from a rest, or zero position, to some location and dwells then returns to rest again.

FIG. 5 is a milli-actuator driver voltage graph 501 and current graph 502 according to the present invention. The rate of movement control circuit 400 of FIG. 4 is but one embodiment of the present invention, and for illustrative purposes discussion of the graph of FIG. 5 will be referred to in explaining that graph. The driver current 502 undergoes a sharp negative increase from a first equilibrium rest level 502.6 to a predetermined current level 502.1, which causes a milli-actuator to begin traveling from a rest or zero position to a desired data position. The movement of the milli-actuator is represented by the corresponding driver voltage 501 increasing from its rest or zero position 501.1 to a first predetermined voltage level 501.3. Prior to the driver voltage 501 reaching the first predetermined voltage level 501.3 the driver current 502 begins to increase, as shown by the negative but decreasing slope 502.2. The driver current 502 is increased to prevent the milli-acutator from overshooting the desired data position. The phenomenon is reflected by the driver voltage's decreasing slope 501.2, which corresponds to the milli-actuator slowing down as it approaches a desired data position. According to the present invention, the driver current is increased until it reaches a second equilibrium or rest level 502.4 and it is maintained at approximately this second level over a first dwell period 502.5. The driver current 502 reaches this second equilibrium 502.4 at substantially the same time as the driver voltage 501 reaches the first predetermined voltage level 501.3, which corresponds to the milli-actuator position as it arrives at the desired data position. The driver voltage 501 remains at the first predetermined voltage level 501.3, and the milli-actuator dwells at the desired data position, during the driver current's 502 entire first dwell period 502.5. At the end of the dwell period 502.5, the driver current 502 rises sharply to the first equilibrium or rest level 502.8 and maintains this level for a second dwell period 502.9. As the driver current 502 switches back to the first rest level 502.8, the driver voltage 501 begins to decrease from the first predetermined level 501.3 to the rest or zero position 501.5. Notice the characteristics of the driver voltage 501 during this decrease, which transpires over the second dwell period 502.9 of the driver current 502, the falling edge 501.4 has a smaller negative slope than the corresponding falling edges driver voltages exhibit in the prior art (see FIG. 2 and FIG. 3). The change in the driver voltage translates to the milli-actuator returning from the desired track position to its rest or zero position. Further, the decreased negative slope of the voltage corresponds to the decreased rate of return of the milli-actuator being driven by the driver current 502. Then at mid-scale 510 this operation is repeated.

Disk drives using multiple milli-actuator can have problems when one actuator returning to the rest position and another actuator is commanded to seek and both are traveling in the same direction, due to the reactive impulse energy discussed above. Further the at least two milli-actuators will both demand current from the same power supply. If the power supply capability is limited then drive operation could be impaired by this dual current draw demand. FIG. 5 illustrates voltage and power supply current corresponding to a actuator being driven according to the present invention. The slow return to the rest position of the now inactive actuator will reduce the power supply current demand as well as minimizing impulse disturbance.

FIG. 5 shows that the power supply current is turned off 502.9 as the driver voltage 501 returns back to zero position 501.4. This is because the operational amplifier 410 which acts as a driver, is turned off and the only current path is through the transconductance-discharging amplifier or transconductance amplifier, 420. The current path here is through the milli-actuator capacitor, C2, R5, the transconductance amplifier 420 and the circuit ground. The circuit current flow sense is positive into the supply and out flow is negative as is seen above in this figure.

Figure 6:
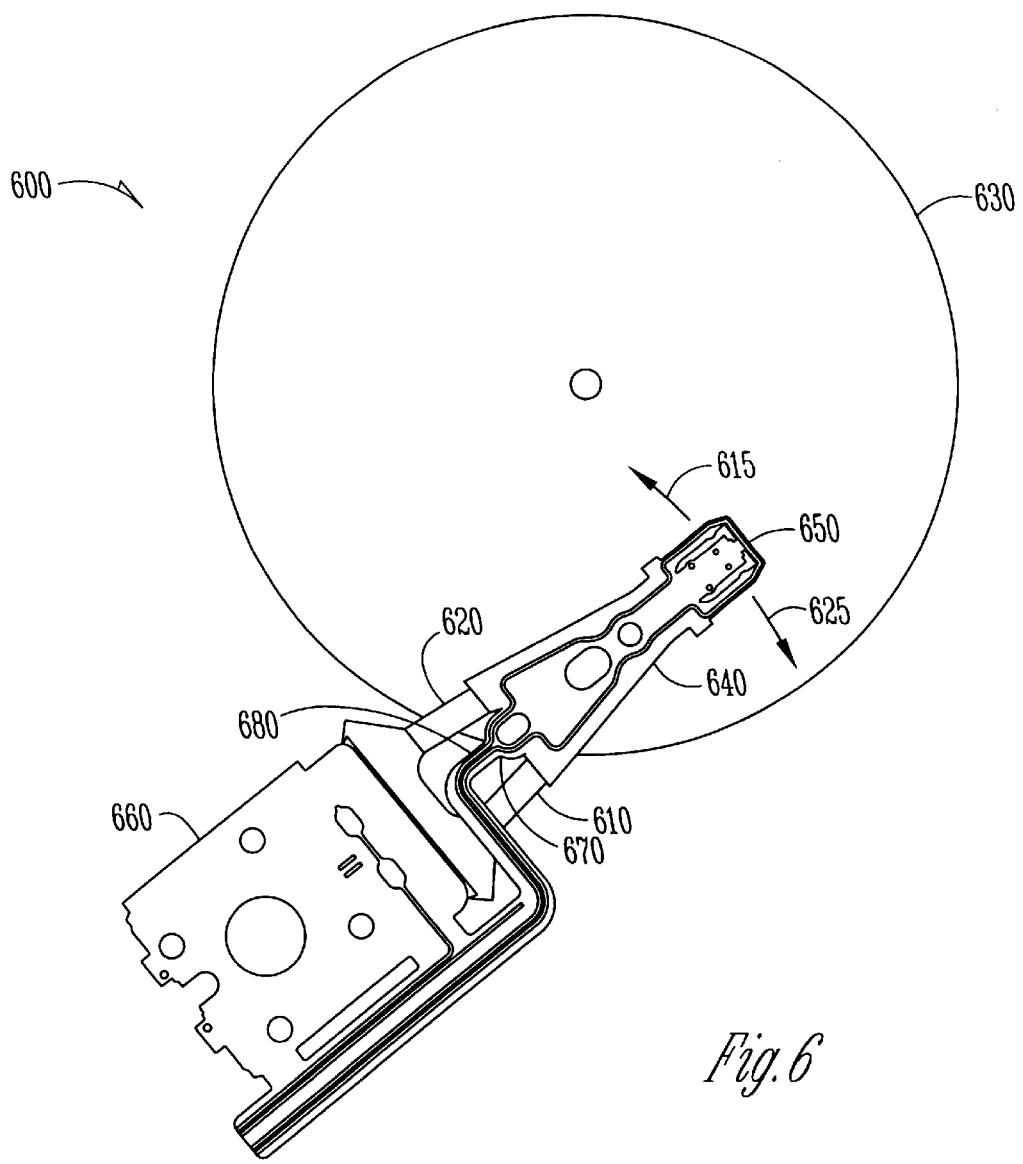
FIG. 6 shows a top-plane view of a suspension design that includes a milli-actuator according to the present invention.

FIG. 6 shows a top-plane view of a suspension design 600 that includes milli-actuators, 610 and 620, according to the present invention. More specifically, the figure depicts a disk 630 with a suspension (also referred to as load beams or load springs) 640 located above said disk 630. Attached at one end of the suspension 640 is a slider, with a magnetic transducer coupled to it. The combination of the slider and the transducer form a head 650. It should be noted that many sliders have one transducer, and it should be further noted that this invention is equally applicable to sliders having more than one transducer. In this embodiment, the other end of the suspension 640 is an actuator shaft 660, which allows an actuator assembly to be rotatably attached to a base (not shown, see FIG. 1 for example).

Coupled to the suspension 640 are two milli-acutators, a first milli-actuator 610 and a second milli-actuator 620, both coupled to an electrically conductive material, 670 and 680 respectively. When commanded to seek to a particular track, the suspension 640 moves radially about the actuator shaft 660 until the head 650 is at the desired location on the disk 630. The milli-actuators, 610 and 620, are responsible for the fine radial movement of the suspension 640. In the embodiment shown in FIG. 6, the milli-actuators, 610 and 620, are made of a piezo-electric material (e.g., crystalline quartz, Rochelle salt, etc. . . . ). Thus, the milli-actuators, 610 and 620, expand or contract as a function of the charge placed upon the piezo-electric material or the voltage across the milli-actuator, 610 or 620. The charge is transported to the milli-actuator, 610 or 620, across the electrically conductive material, 670 or 680, coupled to it. As charge is delivered to the first milli-actuator 610, the suspension will be caused to move in a first direction 615 by the contraction or expansion of the first milli-actuator 610. Similarly, as charge is delivered to the second milli-actuator 620, the suspension 640 will be caused to move in a second direction 625 by the contraction or expansion of the second milli-actuator 620.

Figure 7:
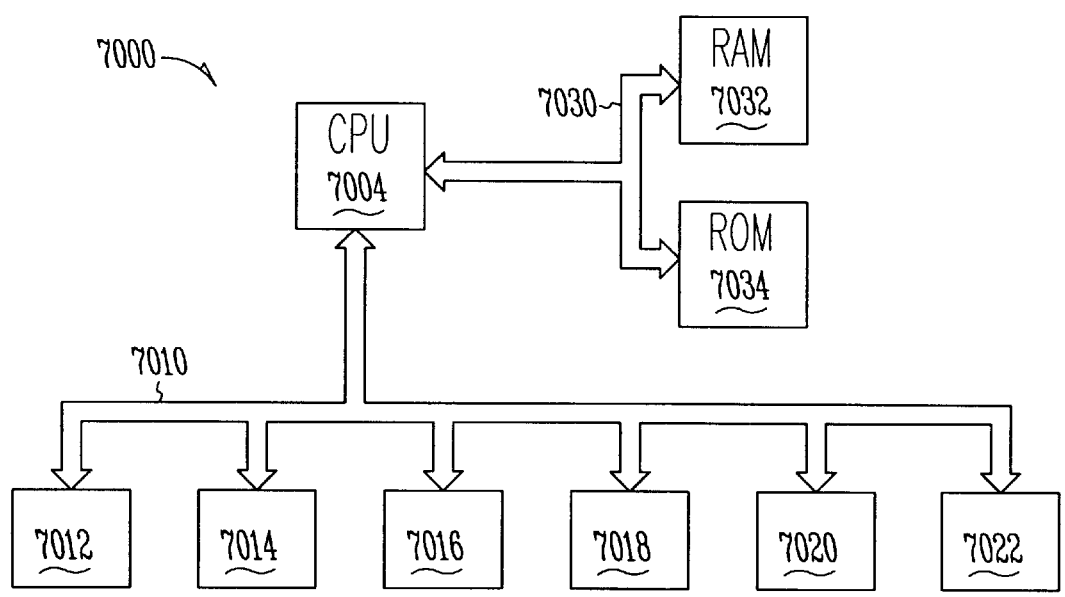
FIG. 7 is a schematic view of a computer system.

FIG. 7 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Advantageously, this invention has several features that can be useful in the application of mass storage device technologies. For example, by causing a first milli-actuator to return to a rest position at a reduced rate, with respect to the second seeking milli-actuator, improves the quality of operation by minimizing the reactive energy and thereby the disturbance to the seeking milli-actuator. Another advantage the present invention offers is a means to simultaneously move multiple milli-actuators, allow them to be powered by a single, limited power supply and reduce the degradation in the disc operation, which is often observed in such dual current draw scenarios. Furthermore, the present invention discloses circuitry that can drive the milli-actuators such that they travel in such a way as to exhibit the desirable characteristics discussed above. The circuitry according to the present invention also affords the circuit designer flexibility in her design.

CONCLUSION

In conclusion, a method of minimizing the reactive impulse on a milli-actuator arm and relaxing the current demand on a power supply is disclosed. Multiple movable milli-actuator arms are mounted on a single E-Block actuator arm or single actuator assembly 120. The method further includes causing a first movable actuator arm, and a second movable actuator arm to seek to a predetermined track position and a first movable actuator arm is returned to a rest position at a speed less than the speed of the second actuator arm when a second movable actuator arm is seeking. In one embodiment, at least two movable actuator arms are mounted on a single E-Block actuator arm or a single actuator assembly 120. In another embodiment of the present invention, the returning step includes moving the second movable actuator arm in the same direction as the first movable actuator arm.

An information handling system is also disclosed. The information handling system includes a base, a disc rotatably attached to the base 112, and an actuator assembly 120 movably attached to the base. The actuator assembly 120 further includes a voice coil 128 attached to the actuator assembly 120 where at least one magnet (either 130 or 131) attached to the base 112 and positioned near the voice coil 128 to form a voice motor coil. The information handling system also includes an apparatus for commanding a first movable actuator arm to return to a rest position at a reduced speed with respect to a second movable actuator arm when that second movable actuator arm is being commanded to seek. The information handling system also includes an apparatus for commanding the second movable actuator arm to seek to a predetermined track position. The second movable actuator arm can be commanded to seek while the first movable actuator arm is not at a rest position.

Also disclosed is a disc drive 100. It includes a base 112, a disc rotatably attached to the base 112, and an actuator attached to the base 112, one end of the actuator having a transducer and the other end of the actuator having a voice coil 128 which forms a portion of a voice coil motor. The actuator includes a first rotatable portion and a second rotatable portion. The disc drive 100 further includes a disc drive control circuit which includes a first rate of movement control circuit 400, and a second rate of movement control circuit 400. These circuits drive the first rotatable portion of the actuator at a different rate than the second rotatable portion. The second rate of movement control circuit 400 drives the second rotatable portion of the actuator at a predetermined speed.

In one embodiment the first rate of movement control circuit 400 further drives the first rotatable portion of the actuator such that it returns to a rest position at a speed less than the speed of the second rotatable portion of the actuator when the second movable actuator arm is being commanded to seek. In another embodiment the second rate of movement control circuit 400 further drives the second rotatable portion of the actuator such that it seeks to a predetermined track position faster than the rate at which the first rotatable portion of the actuator returns to a rest position.

A rate of movement control circuit, according to the present invention features an operational amplifier configuration 410, an apparatus for biasing the operational amplifier coupled to the operational amplifier 410, an apparatus to disable the operational amplifier 410 coupled to the operational amplifier 410, a transconductance amplifier configuration and an apparatus to disable the transconductance amplifier 420 in one embodiment. In yet another embodiment of this invention the operational amplifier configuration 410 includes a first resistor and a capacitor connected in parallel, coupled to a first input of the operational amplifier 410 in a negative feedback loop, a second resistor. A first node is coupled to a power supply and a second node is coupled to a first input of the operational amplifier 410 and a third resistor coupled to a first input of the operational amplifier 410.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:
1. A method comprising steps of:
    (a) providing a plurality of independently movable milli-actuator arms on a single E-Block;
    (b) causing a first movable milli-actuator arm to move from a rest position to a first predetermined track position at a first speed while maintaining a second movable milli-actuator arm at a second predetermined track position at a second speed; and
    (c) returning the first movable milli-actuator arm to the rest position at a third speed less than the second speed.
2. The method of claim 1 wherein the returning step (c) includes limiting the speed at which an independently movable milli-actuator arm travels by limiting a current driving the moveable milli-actuator arm.
3. The method of claim 1 wherein the returning step (c) including limiting an acceleration at which an independently movable milli-actuator arm is limited by limiting a current driving the independently moveable milli-actuator arm.
4. The method of claim 1, wherein the returning step (c) includes simultaneously moving the second movable milli-actuator arm in a same direction as the first moveable milli-actuator arm.
5. The method of claim 1, wherein the returning step (c) includes returning the first moveable milli-actuator arm to the rest position at a speed less than the second speed as the second moveable milli-actuator arm is traveling to a predetermined track position.
6. The method of claim 1 wherein the returning step (c) includes driving the first independently moveable milli-actuator arm with zero current as the first independently moveable milli-actuator arm travels from the first predetermined track position to a rest position.
7. The method of claim 1 wherein the causing step (b) includes driving the second independently moveable milli-actuator arm with a first predetermined current level until commanded to seek.
8. An apparatus comprising:
    an actuator that comprises:
        a first independently rotatable milli-actuator portion having a first transducer; and a second rotatable milli-actuator portion having a second transducer; and at least one actuator control circuit, which drives the first rotatable milli-actuator portion of the actuator at two different rates such that a return to rest movement is limited to a lower rate than a seek movement.

9. The apparatus of claim 8, wherein a first actuator control circuit further drives the first rotatable milli-actuator portion to return to a rest position at a speed less than the speed of the second rotatable milli-actuator portion when the second movable milli-actuator arm is being commanded to seek.

10. The apparatus of claim 8, wherein a second actuator control circuit further drives the second rotatable milli-actuator portion to seek to a predetermined track position higher rate than the rate at which the first rotatable milli-actuator portion returns to a rest position.

11. The apparatus of claim 8, wherein the actuator control circuit comprises:

an operation amplifier configuration;

an apparatus for biasing the operational amplifier coupled to the operational amplifier;

an apparatus for disabling the operational amplifier coupled to the operational amplifier;

a transconductance amplifier configuration; and an apparatus for disabling the transconductance amplifier.

12. The apparatus of claim 11, wherein the operational amplifier configuration comprises:

a fist resistor and a capacitor connected in parallel, coupled to a first input of the operational amplifier in a negative feedback loop;

a second resistor, wherein a first node is coupled to a power supply and a second node is coupled to a first input of the operational amplifier; and a third resistor coupled to a first input of the operational amplifier.

13. The apparatus of claim 8, wherein the actuator control circuit adjusts the speed at which first and second independently rotatable milli-actuator portion by adjusting the current driving the first and second independently rotatable milli-actuator portion.

14. An information handling system, comprising:

a base;

a disc rotatably attached to the base;

an actuator assembly movably attached to the base, wherein the actuator assembly comprises a plurality of actuator arms wherein at least one of a plurality of independently movable milli-actuator arms are attached to at least one actuator arm and the actuator assembly further comprises a voice coil attached to the actuator assembly;

at least one magnet attached to the base and positioned near the voice coil to form a voice motor coil; and means for commanding a first movable milli-actuator arm to return to a rest position at a reduced speed with respect to a second movable milli-actuator arm and for commanding the second movable mile-actuator arm to seek to a predetermined track position.

* * * * *